No. 862,145. PATENTED AUG. 6, 1907.
T. A. EDISON.
PROCESS OF MAKING SEAMLESS TUBULAR POCKETS OR RECEPTACLES
FOR STORAGE BATTERY ELECTRODES.
APPLICATION FILED APR. 28, 1905.

Attest:
Edgworth Greene
Anna R. Klehm

Inventor.
Thomas A. Edison
by
Frank L. Dyer Atty.

UNITED STATES PATENT OFFICE.

THOMAS A. EDISON, OF LLEWELLYN PARK, ORANGE, NEW JERSEY, ASSIGNOR TO EDISON STORAGE BATTERY COMPANY, OF WEST ORANGE, NEW JERSEY, A CORPORATION OF NEW JERSEY.

PROCESS OF MAKING SEAMLESS TUBULAR POCKETS OR RECEPTACLES FOR STORAGE-BATTERY ELECTRODES.

No. 862,145.      Specification of Letters Patent.      Patented Aug. 6, 1907.

Application filed April 28, 1905. Serial No. 257,944.

*To all whom it may concern:*

Be it known that I, THOMAS ALVA EDISON, a citizen of the United States, residing at Llewellyn Park, Orange, county of Essex, and State of New Jersey, have invented certain new and useful Processes of Making Seamless Tubular Pockets or Receptacles for Storage-Battery Electrodes, of which the following is a description.

My invention relates to a process of making small thin seamless perforated tubes adapted to contain active material under pressure and arranged to be assembled in any suitable way upon or in a support or grid to constitute a storage battery electrode.

The object of my present invention is to devise a process by which seamless tubes for the purpose of forming pockets for containing active material may be made at low cost and in a commercial way. The difficulties of making tubes of nickel of about one-quarter of an inch bore, and more than three inches long, were very great, and were overcome only after extensive experiments.

Figure 1:
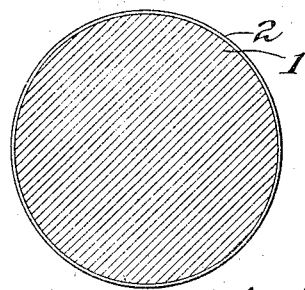
Figure 2:
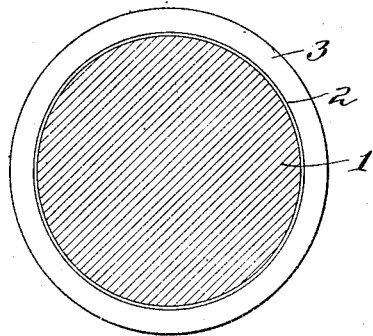
Figure 3:
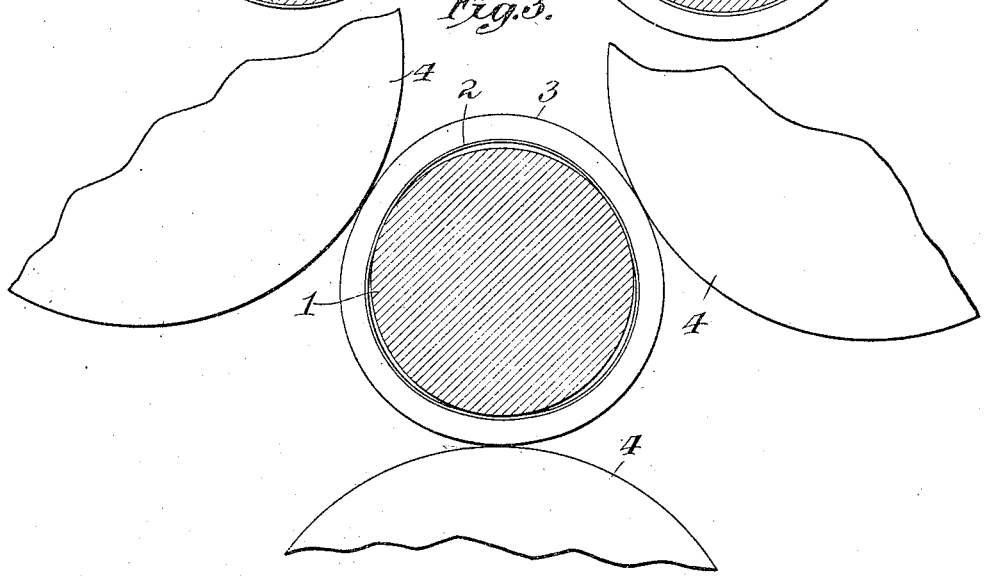
Figure 4:
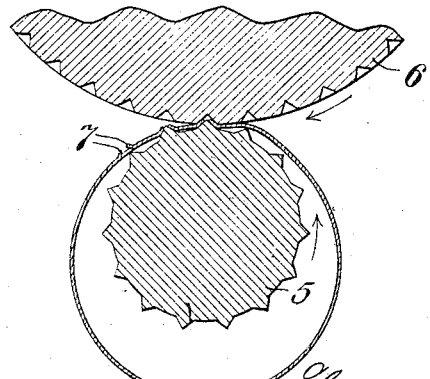

In order that the present invention may be better understood, attention is directed to the accompanying drawing, forming a part of this specification, and in which Figure 1 shows the nickel mandrel with a copper film thereon, the proportions being greatly exaggerated, since in practice, the diameter of the mandrel is about twenty-five hundred times the thickness of the copper film. Fig. 2, a corresponding view showing the deposit of nickel applied to the copper film, the proportions being also exaggerated, since in practice the nickel deposit is about thirty times as thick as the copper deposit. Fig. 3 a diagrammatic view, showing the mandrel with the electrodeposited film thereof being subjected to the rolling pressure, and Fig. 4 a similar view illustrating the manner of perforating the seamless tube. In all of the above views, corresponding parts are represented by the same numerals of reference.

The mandrel 1 is made preferably of nickel of the desired length and diameter for the purpose. Nickel is preferably used for the mandrel owing, first, to its superior hardness, so as to withstand the heavy rolling pressure subsequently applied, second, to its non-oxidizable character, so that its surface may not become roughened or pitted by oxidation to make more difficult the problem of removing the deposited tube therefrom, and third, to its superior and homogeneous structure, permitting a highly polished surface on which a coherent and uniform electrodeposit may take place, and from which the deposit may be smoothly separated, as will be hereinafter pointed out. I prefer to make the tubes about one-quarter of an inch in diameter, in order that no part of the active material may be isolated electrolytically, or, in other words, objectionably removed from the conducting perforated walls. I first plate on the mandrel, in the usual way, a thin film 2 of copper about .0001'' in thickness and upon the copper film I deposit a plating of nickel 3, to a thickness of about .003'', a double chlorid ammonia nickel solution being preferably used maintained in a heated state during the plating operation. I now subject the plated mandrel to a rolling operation between rolls 4, exerting sufficient pressure thereon to compress the plated layers and increase their diameter so as to loosen the same from the mandrel 1, after which the tube thus formed is removed from the mandrel. I now remove the film of copper which adheres to the interior of the tube in any suitable way, such for example, as by immersion in a solution of peroxid of hydrogen in ammonia or electrolytically, by employing the tube as an anode in a caustic potash solution containing citric or tartaric acid and plating the copper off. The resulting thin nickel tube is now annealed in a hydrogen atmosphere, so as to increase its ductility and permit it to be perforated. The perforating operation is performed over the male die 5, having teeth thereon coöperating with recesses 6, whereby the metal of the tube will be broken out or displaced to form burs or projections 7 (see Fig. 4). After the tube has been thus perforated, it is preferably plated with a thin coating of an alloy of nickel and cobalt so as to increase the contact with the active material, which coating is welded in place at high temperature in a hydrogen atmosphere (as I describe in my patent No. 734,522, dated July 28th, 1903), thus completing the manufacture of the tube, which is then ready for receiving the active material.

Having now described my invention, what I claim as new therein and desire to secure by Letters Patent, is as follows:

1. The process of making seamless metal tubes, which consists in depositing the tube electrolytically on a suitable mandrel and in subjecting the deposit to a rolling operation to separate the same, substantially as set forth.

2. The process of making seamless metal tubes, which consists in depositing a thin film of copper on a suitable metallic mandrel, in depositing on the copper film the metal from which the tube is to be formed, and in finally subjecting the tube and mandrel to a rolling pressure to separate the two, substantially as set forth.

3. The process of making seamless metal tubes, which consists in depositing a thin film of copper on a suitable mandrel, in depositing a nickel tube on the copper film, and finally in rolling the nickel tube to separate the same from the mandrel, substantially as set forth.

This specification signed and witnessed this 26th day of April 1905.

THOS. A. EDISON.

Witnesses:
FRANK L. DYER,
ANNA R. KLEHM.